US009951289B2

(12) United States Patent
Tsaih et al.

(10) Patent No.: US 9,951,289 B2
(45) Date of Patent: Apr. 24, 2018

(54) REFRIGERATION OIL

(71) Applicant: Patech Fine Chemicals Co., Ltd., Taipei (TW)

(72) Inventors: Jeng-Shiang Tsaih, Changhua County (TW); Hsu-Hua Tang, Changhua County (TW); Jung-Tsung Hung, Changhua County (TW); Tai-Her Tsai, Changhua County (TW); Hsin-Li Huang, Changhua County (TW)

(73) Assignee: PATECH FINE CHEMICALS CO., LTD., Taipei (TW)

( * ) Notice: Subject to any disclaimer, the term of this patent is extended or adjusted under 35 U.S.C. 154(b) by 0 days.

(21) Appl. No.: 14/992,337

(22) Filed: Jan. 11, 2016

(65) Prior Publication Data

US 2016/0281017 A1 Sep. 29, 2016

(30) Foreign Application Priority Data

Mar. 27, 2015 (TW) .............................. 104110046 A

(51) Int. Cl.
*C09K 5/04* (2006.01)
*C10M 105/38* (2006.01)
*C10M 171/00* (2006.01)

(52) U.S. Cl.
CPC ........... *C10M 105/38* (2013.01); *C09K 5/045* (2013.01); *C10M 171/008* (2013.01); *C09K 2205/104* (2013.01); *C09K 2205/11* (2013.01); *C09K 2205/122* (2013.01); *C09K 2205/24* (2013.01); *C10M 2207/2835* (2013.01); *C10M 2207/2895* (2013.01); *C10M 2209/04* (2013.01); *C10M 2209/103* (2013.01); *C10N 2220/022* (2013.01); *C10N 2220/023* (2013.01); *C10N 2220/302* (2013.01); *C10N 2230/06* (2013.01); *C10N 2230/10* (2013.01); *C10N 2240/30* (2013.01)

(58) Field of Classification Search
CPC ................ C09K 5/045; C09K 2205/24; C09K 2205/104; C09K 2205/11; C09K 2205/122; C09K 5/04; C10M 105/38; C10M 171/008; C10M 2207/2835; C10M 2209/04; C10M 2209/103; C10M 2207/2895; C10N 2220/022; C10N 2220/302; C10N 2230/10; C10N 2220/023; C10N 2230/06; C10N 2240/30
USPC ....................................... 252/68; 62/468, 467
See application file for complete search history.

(56) References Cited

U.S. PATENT DOCUMENTS

| | | | |
|---|---|---|---|
| 5,158,698 A * | 10/1992 | Jolley .................. | C07G 17/002 252/67 |
| 5,576,451 A * | 11/1996 | Trius Oliva ............ | C07C 69/30 510/535 |
| 5,798,054 A * | 8/1998 | Sato ....................... | C09K 5/045 252/68 |
| 5,830,833 A | 11/1998 | Grasshoff et al. | |
| 6,759,373 B2 * | 7/2004 | Tazaki ............... | C10M 171/008 252/68 |
| 6,844,299 B2 | 1/2005 | Bessonette et al. | |
| 2013/0200295 A1 * | 8/2013 | Rebrovic ............... | C09K 5/045 252/68 |
| 2013/0231498 A1 | 9/2013 | Inayama et al. | |
| 2016/0230111 A1 * | 8/2016 | Li ........................ | C10M 105/38 |

FOREIGN PATENT DOCUMENTS

| | | |
|---|---|---|
| CN | 1259986 A | 7/2000 |
| CN | 104220415 A | 12/2014 |
| EP | 0678115 A1 | 10/1995 |
| EP | 1312663 A1 | 5/2003 |
| GB | 2263481 A | 7/1993 |
| JP | 04183789 A * | 6/1992 |
| TW | 201333177 A1 | 8/2013 |
| TW | 201435080 A1 | 9/2014 |

OTHER PUBLICATIONS

VORANOL (TM) Polyether Polyols, Dow Chemical Company, Jan. 2003, pp. 1-4.*
CAS Registry, 31694-55-0, Nov. 16, 1984.*
Takeshi Okido, et al. "Development of Refrigeration Oil for Use with R32," Purdue University, Purdue e-Pubs, in International Refrigeration and Air Conditioning Conference, 2012, pp. 1-7.
Takeshi Okido, et al. "Development of refrigeration oil for use with R32," JX Nippon Oil & Energy Corporation, 15th International Refrigeration and Air Conditioning Conference at Purdue, Jul. 14-17, 2014, pp. 1-6.
Jung-Tsung Hung, et al "A New Method for Calculating Viscosity and Solubility of Lubricant-Refrigerant Mixtures" Patech Fine Chemicals Co., Ltd. in 15th International Refrigeration and Air Conditioning Conference at Purdue, Jul. 14-17, 2014, pp. 1-10.
Office Action dated Aug. 27, 2015 in corresponding Taiwanese application (Search Report included) with English language translation.
The Extended European Search Report (Search Opinion included) dated Apr. 13, 2016 in corresponding European application.

* cited by examiner

*Primary Examiner* — Douglas J McGinty
(74) *Attorney, Agent, or Firm* — Bacon & Thomas, PLLC

(57) ABSTRACT

The present invention relates to a novel refrigeration oil comprising any one of the following three: (A) a polyol ester (POE) obtained by reacting one or more polyol(s) with one or more $C_{4-10}$ straight or branched chain fatty acid(s) and one or more $C_{5-10}$ fatty acid(s) having a specific structure, (B) a mixture of above (A) polyol ester and another polyol ester obtained by reacting one or more polyol(s) with one or more $C_{4-10}$ straight or branched chain fatty acid(s) and one or more $C_{5-10}$ fatty acid(s) having a specific structure, and (C) a mixture of one or both of the aforesaid (A) polyol ester and (B) polyol ester with a polyol ester obtained by reacting a polyol with the other fatty acid than the aforesaid $C_{5-10}$ fatty acid(s) having a specific structure.

11 Claims, No Drawings

REFRIGERATION OIL

TECHNICAL FIELD

The present invention relates to a novel refrigeration oil comprising any one of the following three: (A) a polyol ester (POE) obtained by reacting one or more polyol(s) with one or more $C_{4-10}$ straight or branched chain fatty acid(s) and one or more $C_{5-10}$ fatty acid(s) having a specific structure, (B) a mixture of above (A) polyol ester and another polyol ester obtained by reacting one or more polyol(s) with one or more $C_{4-10}$ straight or branched chain fatty acid(s) and one or more $C_{5-10}$ fatty acid(s) having a specific structure, and (C) a mixture of one or both of the aforesaid (A) polyol ester and (B) polyol ester with a polyol ester obtained by reacting a polyol with the other fatty acid than the aforesaid $C_{5-10}$ fatty acid(s) having a specific structure; and a refrigeration lubricant composition comprising the aforesaid refrigeration oil and difluoromethane (R32) refrigerant or a mixed refrigerant containing difluoromethane (R32) refrigerant, and optional extreme pressure additives, metal deactivators, acid scavengers, anti-oxidants, or other synthetic refrigeration lubricants. The refrigeration oil of the present invention has an excellent lubricity and can be combined with a new generation of environmentally friendly refrigerant having a low miscibility, like difluoromethane (R32, ($CF_2H_2$)), or the mixed refrigerants thereof; the combined working fluid has a adjustable miscibility and high lubricity in the temperature range of $-50 \sim 20°$ C. to make a compressor achieving higher working performance under the running conditions of different temperatures, pressures and filling ratios of refrigerant/refrigeration oil by providing enough working viscosity to obtain better lubricity and reduced wear.

The refrigeration oil of the present application, an additive and R32 refrigerant or the mixed refrigerant containing R32 refrigerant are also referred to as refrigeration working fluid, and the refrigeration working fluid can effectively lubricate a compressor to make it stably working under different running conditions. The refrigeration working fluid constituted by the refrigeration oil of the present application and R32 refrigerant or the mixed refrigerant containing R32 refrigerant also can advantageously achieve higher working performance and further promote the feasibility of practical application under the running conditions of different temperatures, pressures and filling ratios of refrigerant/refrigeration oil by providing enough working viscosity to obtain better lubricity and reduced wear, due to their special miscibility and without using the specific additive recited in Reference 1 (Okido, Takeshi; Takigawa, Katsuya; and Saito, Masanori, "Development of Refrigeration Oil for Use With R32" (2012), *International Refrigeration and Air Conditioning Conference*. Paper 1216. http://docs.lib.purdue.edu/iracc/1216).

BACKGROUND

Due to threats of global warming, pursuant to Kyoto Protocol and Copenhagen Protocol, various countries start to mitigate carbon emission, and thus carbon emission regulations are gradually strict. In addition to complying with the requirements and schedule of the use of relevant refrigerants, refrigerating and air conditioning industrials also need to practically consider the performance maintenance in the application of new generation of refrigerant/refrigeration oil, the continuation of existing equipments, technical feasibility, safety, and application cost, etc.

The new generation of environmentally friendly refrigerants generally include hydrofluoroolefins (HFO) and the mixture thereof, ammonia (R717), carbon dioxide (R744), hydrocarbons (such as R290, R600, etc.), and difluoromethane (R32) etc. Use of hydrofluoroolefins (HFO) and the mixture thereof needs to consider the application cost, ammonia (R717) has problems of toxicity and corrosion, carbon dioxide (R744) refrigerant involves higher equipment cost, and the hydrocarbon refrigerant has potential problems of inflammability and explosion. However, since ozone depletion potential (ODP) by difluoromethane (R32) belonging to HFC refrigerants is zero and its Global Warming Potential (GWP) is only about ⅓ of HFC refrigerants such as conventional R410A (mixed components) or R134A (single component), it has been widely applied to various mixed refrigerants to balance GWP effect. Thus, based on the consideration of the comprehensive properties, R32 refrigerant is considered as one of a next generation of environmentally friendly refrigerants which have most applicability Difluoromethane (R32) refrigerant has been produced and applied from 1990s in a large scale. The existing mixed refrigerants, such as R410A, R407C etc., are the mixtures of difluoromethane (R32). R32 refrigerant is one of the lowest cost and most widely used refrigerants. However, because of its immiscibility with the refrigeration oil suitable for the existing HFC refrigerants, it is not widely used individually until now. Therefore, under the circumstance of lacking the combination with suitable refrigeration oil, difluoromethane can only be mixed with other HFC refrigerants having high GWP (greenhouse effect index) to meet the conditions of existing applications. For example, the components of the common R410A refrigerant is R32/R125 (50/50), whose GWP is up to 1725, and that of R32 itself is only 650. If R410A refrigerant is completely replaced with R32, GWP will be reduced up to 62%.

Although samely classified to HFC refrigerants, difluoromethane (R32) is not applicable environmentally friendly refrigeration oils which are exclusively for a serial of commercially available HFCs developed as of 1990s are not suitable for difluoromethane (R32). The refrigeration oils suitable for use with difluoromethane (R32), which are disclosed in TW 201333177 A1 (Patent Reference 1) or TW 201435080 A1 (Patent Reference 2) or under development, focus to solve the problems of miscibility, which is mainly implemented by using specific branched chain fatty acids to increase miscibility. The cost of the specific branched chain fatty acids, such as 2-methylbutanoic acid, 2-methylpentanoic acid, 2-ethylbutanoic acid (Patent Reference 1) and 2-methylpropanoic acid (Patent Reference 2) etc., is relatively high, and the difference of the miscibility with R32 refrigerant of the specific branched chain fatty acids in combination with the fatty acids such as 2-ethylhexanoic acid or 3,5,5-trimethylhexanoic acid, is so large that stable miscibility cannot be controlled easily. When a compressor requires the refrigeration oil to be different viscosity or miscibility for application, it is difficult for the structure claimed in TW 201333177 A1 to get a solution in a program involving complete miscibility for the kinematic viscosity of 22 to cSt (40° C.) due to the limitation of the structure. The POE having fully branched chain structure mentioned in TW 201333177 A1 causes a low Viscosity Index (usually equal to or less than 95). Due to the fact that the viscosity decreases significantly as the running temperature increases, after combining with refrigerant, this type of refrigeration oil tends to cause insufficient lubricity and causes the equipment worn out or showing a low running performance. This type of refrigeration oil needs to combine with a specific additive to ensure the normal running of refrigeration system due to the consideration of lubricity and wear. The use of a specific additive is not beneficial to commercial extension and results in increasing the application cost.

Reference 2 (Takeshi Okido, Katsuya Takigawa, Hitoshi Takahashi, "Development of Refrigeration Oil for Use With R32", 15th International Refrigeration and Air Conditioning Conference at Purdue, Jul. 14-17, 2014) and TW 201435080 A1 (Patent Reference 2) adopts a complex ester to improve the application property by adjusting the viscosity index and miscibility of the disclosed refrigeration oil. Since the different polymerization of the complex ester will significantly affects viscosity and miscibility of the refrigeration oil, and the ester structures of the non-neopentyl polyol of the complex ester are unfavorable to hydrolysis stability and high temperature stability, there is a need to especially consider the combination of the complex ester with additives or the increase on the does thereof. Moreover, the miscibility of the complex ester sharply vary with viscosity, and thus are not suitable for the refrigeration oil having low viscosity of less than ISO VG 46 (included) or high viscosity of more than ISO VG 120 (included).

There are other manufacturers who adopt super strong acids or solid acids to simultaneously conduct different degrees of condensation and esterification of organic acid to obtain POE having various viscosity and miscibility, and the POE is mixed. However, since it is difficult to control the degree of polymerization, viscosity and miscibility vastly vary and the production is not carried out in large scale commercially. Moreover, the polymerization reaction involves using super strong acids, thereby resulting in low yields and unfavorable cost control.

SUMMARY

The Problems to be Solved by the Present Invention

Generally, the higher is the viscosity of refrigeration lubricant, the more is the miscibility between the lubricant and the refrigerant. For difluoromethane (R32) refrigerant, this phenomena is particularly apparent. Though difluoromethane (R32) refrigerant belongs to HFC refrigerants and is widely used in various mixed refrigerants, such as R410A, R407C, R404C etc., as of 1990s, however difluoromethane (R32) refrigerant itself is nearly immiscible with all the existing refrigeration oils developed for HFC refrigerants.

The present invention provides a novel refrigeration oil comprising any one of the following three: (A) a polyol ester (POE) obtained by reacting one or more polyol(s) with one or more $C_{4-10}$ straight or branched chain fatty acid(s) and one or more $C_{5-10}$ fatty acid(s) having a specific structure, (B) a mixture of above (A) polyol ester and another polyol ester obtained by reacting one or more polyol(s) with one or more $C_{4-10}$ straight or branched chain fatty acid(s) and one or more $C_{5-10}$ fatty acid(s) having a specific structure, and (C) a mixture of one or both of the aforesaid (A) polyol ester and (B) polyol ester with a polyol ester obtained by reacting a polyol with the other fatty acid than the aforesaid $C_{5-10}$ fatty acid(s) having a specific structure. The polyol ester obtained from the reaction by adjusting molecular structure to modify the polarity and the refrigeration oil containing the same have the following three properties: (1) as compared to the existing refrigeration oils, the refrigeration oil of the present invention has an excellent lubricity and can be combined with the additives used in the currently existing refrigeration oils suitable for use with HFC refrigerants; (2) when the refrigeration oil of the present invention is combined with the new generation of environmentally friendly refrigerant having low miscibility with the currently existing refrigeration oils, it has an adequate miscibility in different viscosity range; and (3) the refrigeration oil of the present invention has a higher viscosity index and broader range of application viscosity. These properties provide enough working viscosity and lubricity for running the refrigeration equipments (compressors), whereby mechanical parts are provided with enough lubrication protection and full sealing function, and also because the refrigeration oil is adequately miscible with the refrigerant, the problems that the refrigeration oil in the evaporator fails to return to the compressor (hereafter referred to as returning oil) due to phase separation, and the heat transfer decrease can be avoided.

In addition to the high lubricity, the refrigeration oil of the present application and the refrigeration lubricant composition containing the same also have a high viscosity index (VI) to provide an enough viscosity protection at high temperature operating conditions and prevent the viscosity from increasing too much at low temperature operating conditions such that too large resistance for actuating or running will not happen and in turn the coefficient of performance (COP) of refrigeration can be reduced.

The miscibility of difluoromethane (R32) refrigerant with refrigeration oils is far lower than that of a normal HFC refrigerant with refrigeration oils. Thus, the relationships between viscosity and temperature during equipment running, of the refrigeration lubricant composition containing the same are very important. The refrigeration oil of the present application can effectively protect a compressor to reduce wear, increase sealability, and promote the coefficient of performance (COP) of refrigeration by optionally adjusting the structure of single polyol ester (for example, the reaction product of pentaerythritol with 75 mol % of linear pentanoic acid and 25 mol % of neo-pentanoic acid is considered as a single type of polyol ester) or mixing two or more polyol esters in an adequate ratio to change the miscibility between the refrigeration oil and difluoromethane (R32) refrigerant and further making the refrigeration working fluid reach the required working viscosity.

In addition to the above "excellent lubricity", "working viscosity", "miscibility with a refrigerant", and "viscosity index", the refrigeration oil of the present invention and the refrigeration lubricant composition containing the same also have to meet the other strict requirements for refrigeration lubricant, such as sealed-tube thermal oxidation stability test, low temperature stability, hydrolysis stability, acid value, hydroxyl value, pour point, flash point, water content, and dielectric strength, etc.

EMBODIMENTS

The refrigeration oil of the present invention comprises any one of the following three: (A) a polyol ester (POE) obtained by reacting one or more polyol(s) with one or more $C_{4-10}$ straight or branched chain fatty acid(s) and one or more $C_{5-10}$ fatty acid(s) having a specific structure, (B) a mixture of above (A) polyol ester and another polyol ester obtained by reacting one or more polyol(s) with one or more $C_{4-10}$ straight or branched chain fatty acid(s) and one or more $C_{5-10}$ fatty acid(s) having a specific structure, and (C) a mixture of one or both of the aforesaid (A) polyol ester and (B) polyol ester with a polyol ester obtained by reacting a polyol with the other fatty acid than the aforesaid $C_{5-10}$ fatty acid(s) having a specific structure. In the refrigeration oil of the present invention, the amount of the polyol ester synthesized in the present invention is between 50 wt % and 100 wt %, preferably more than 85 wt %.

The $C_{4-10}$ fatty acid(s) included in the refrigeration oil of the present invention may preferably be $C_{5-9}$ fatty acid(s), for example n-pentanoic acid, n-hexanoic acid, n-heptanoic acid, n-octanoic acid, n-nonanoic acid, n-decanoic acid, 2-methylproanoic acid, 2-methylbutyric acid, 3-methylbutyric acid, 2-methylhexanoic acid, 2-ethylpentanoic acid, 2-ethylhexanoic acid, 3,5,5-trimethylhexanoic acid and the like, The $C_{5-10}$ fatty acid(s) having a specific structure included in the reef refrigeration oil of the present invention may be a single acid or a mixed acid of the $C_{5-10}$ fatty acid(s), comprising a single acid or a mixed acid of neo-pentanoic acid to neodecanoic acid (Neo-$C_{5-10}$ acid), the acid amount of $C_{5-10}$ fatty acid(s) having a specific structure involved in the polyol ester may be 1-50 wt %, preferably 5-35 wt %, most preferably 10-30 wt %.

The polyol forming the ester component of the refrigeration oil of the present invention is at least one selected from the group consisting of: neopentyl glycol (NPG), 3-hydroxy-2,2-dimethylpropyl 3-hydroxy-2,2-dimethylpropanoate (HPHP), trimethylolpropane (TMP), ditrimethylolpropane (DiTMP), pentaerythritol (PE), dipentaerythritol (DiPE) and tripentaerythritol (Tri-PE).

According to the constitutions of the fatty acid(s) and the selection of the polyol, the viscosity of the refrigeration oil of the present invention may be in the range of 22 to 320 cSt at operating temperature of 40° C., preferably 32 to 220 cSt, whose corresponding viscosity index to structure is at least more than 95, preferably more than 100, most preferably more than 120.

The refrigeration oil of the present invention used in combination with difluoromethane (R32) refrigerant or a mixed refrigerant containing R32 refrigerant has higher working viscosity and lubricating film thickness to ensure lubricating effect and avoid wear. According to Reference 2 published by Takeshi Okido, Katsuya Takigawa, Hitoshi Takahashi, "Development of Refrigeration Oil for Use With R32", 15th International Refrigeration and Air Conditioning Conference at Purdue, Jul. 14-17, 2014J it is shown that under the premise of the use of a refrigeration oil having the same ISO VG viscosity grade, a refrigeration working fluid having higher viscosity has a higher lubricity. According to Reference 3 developed by Jung-Tsung Hung, Jeng-Shiang Tsaih, Hsu-Hua Tang, "A New Method for Calculating Viscosity and Solubility of Lubricant-Refrigerant Mixtures", 5th International Refrigeration and Air Conditioning Conference at Purdue, Jul. 14-17, 2014 and Test Equipment Simulation of PVT, the refrigeration working fluid constituted by the refrigeration oil of the present invention has a high working viscosity.

The refrigeration oil of the present invention may be incorporated with one or more additive(s) selected from the group consisting of acid scavengers, extreme pressure additives, anti-oxidants, metal deactivators, or other synthetic refrigeration lubricants.

The working fluid formed with the refrigeration oil of the present invention in different application viscosity grades has higher lubricity and working viscosity in comparison with the working fluid formed with a conventional refrigeration lubricant suitable for HFC refrigerants, or has high lubrication and protective effect in comparison with the working fluid formed with refrigeration oil suitable for R32 refrigerant disclosed in Reference 1 and Reference 2.

The refrigeration oil of the present invention may be used in combination with various additives suitable for a refrigeration oil for HFC refrigerants used at the current stage, for example acid scavengers, extreme pressure additives, anti-oxidants, or metal deactivators, but need not be used in combination with specific additives as those disclosed in Reference 1 or suitable for other refrigeration oils recently developed.

The refrigeration oil of the present invention may be used in combination with other types of synthetic refrigeration lubricants such as polyalkylene glycols (PAG), polyvinyl ether (PVE). The used ratio of the refrigeration oil of the present invention to other types of refrigeration lubricants may be between 100:0 and 60:40, preferably 100:0 and 85:15.

The refrigeration oil of the present invention is suitable for difluoromethane (R32) refrigerant and a mixed refrigerant of difluoromethane (R32) refrigerant with other refrigerants, whose mixing ratio may be 100/0~10/90.

The used ratio of the refrigeration oil of the present invention to the refrigerant may be 1/99~50/50, more preferably 5/95~35/65, most preferably 10/90~30/70. When the ratio of the refrigerant included therein is less than the aforesaid range, refrigerating capacity will be reduced, and when the ratio is more than the aforesaid range, lubricity will be reduced. The refrigeration oil of the present invention may be used for various refrigeration compressor.

In the specification of the present application, a refrigeration oil and refrigeration lubricant can be used interchangeably.

[Synthesis]

Most of the hydroxyl groups of the polyol involved in the refrigeration oil of the present invention must be esterified, and the hydroxyl value of the obtained product is less than 15, preferably less than 5, most preferably less than 3.

The synthesis method of the refrigeration oil of the present invention comprises a esterification step and a purification step.

Esterification step: one or more straight or branched saturated $C_{4-10}$ fatty acid(s) and one or more $C_{5-10}$ fatty acid(s) having a specific structure in an appropriate amount are reacted with one, two or more polyols selected from the groups consisting of tripentaerythritol, dipentaerythritol, pentaerythritol, or other polyols having a neopentyl group in the presence (or absence) of catalyst, until the hydroxyl value is equal to or less than 15 mgKOH/g, preferably equal to or less than 5 mgKOH/g, more preferably equal to or less than 3 mgKOH/g at a reaction temperature ranging from 150 to 250° C., preferably 180 to 240° C., more preferably 200 to 230° C., depending on the starting material and the catalyst.

Conventional catalysts include stannous oxalate, stannous oxide, stannous chloride, tetrabutyl titanate, tripropyl titanate or methanesulfonic acid and the like.

Purification Step:

Removal of water: the water is removed to remain equal to or less than 50 ppm by drying under high vacuum.

Removal of residual acids: the acid value of the polyol ester is decreased to remain equal to or less than 0.02 mgKOH/g by neutralization with the addition of a base (for example, sodium hydroxide, calcium hydroxide, etc.) and distillation.

Removal of catalyst and impurity: the catalyst and the impurity are actually removed by filtration via the addition of active carbon, clay, adsorbents for acid or base and filtering aid (perlite).

In order to prevent a lubricant from the oxidation, deterioration or decomposition of a lubricant into acidic components which in turn corrode the inside of a system under the influence by heat, an external gas or moisture entering a refrigeration cycle due to leakage, or residues such as anti-rust agents left in the refrigeration cycle, an acid scavenger can be added into a refrigeration oil. Suitable acid scavenger may be glycidyl ester, glycidyl ether and α-epoxyolefin etc. The acid scavenger is used in a general amount of 0-2 wt %, preferably 0-1 wt %.

In order to prevent the wear of the metal surface of the sliding portion of a compressor, to enhance lubricity and reduce frictional heat, an extreme pressure additive can be added into a refrigeration oil as wear improving agent. Suitable additives nay be phosphorus-based, sulfur-based and organic or inorganic metal extreme pressure additives. As phosphorus-based extreme pressure additives, trialkyl phosphate esters and trialkyl phosphite ester may be used. As trialkyl phosphate ester, tricresyl phosphate, triphenyl phosphate, tris(ter-butylphenyl)phosphate, monophenyl bis(tert-butylphenyl)phosphate, diphenyl(tert-butylphenyl) phosphite, etc., may be exemplified. As trialkyl phosphite esters, triethyl phosphite, tributyl phosphite, tricresyl phosphite, tris(nonylphenyl)phosphite, tris(ethylhexyl)phosphite, tridecyl phosphite, trilauryl phosphite, etc., may be exemplified. As sulfur-based extreme pressure additives, sulfurized grease, sulfurized fatty acids, sulfurized esters, sulfurized olefins, thiocarbamates, sulfur terpenes, dialkyl thiodipropionate esters, etc., may be exemplified. The extreme pressure additives are used in a general amount of 0-4 wt %, preferably 0.2-2 wt %.

In order to prevent an external gas from entering into a refrigeration cycle system thereby leading to the oxidation or deterioration of a lubricant, an antioxidant is optionally added, for example, phenol-based antioxidant such as 2,6-di-tert-butyl-4-methylphenol, 2,6-di-tert-butyl-4-ethylphenol, 2,2'-methylenebis(4-methyl-6-tert-butylphenol), etc., or amine-based antioxidant such as phenyl-α-naphthylamine, N—N'-diphenyl-p-phenylenediamine, etc. The antioxidant is used in a general amount of 0-1 wt %, preferably 0-0.5 wt %.

In order to be able to form an inert protective film on the surface of a metal or generate chelates with a metal ion thereby inhibiting the oxidation of a refrigeration oil catalyzed with the metal or the ion thereof, metal deactivators may be added into a refrigeration oil. Suitable metal deactivators may be methyl benzotriazole derivative (Tolutriazole), benzotriazole derivatives, thiadiazole derivatives etc. The metal deactivators are used in a general amount of 0-0.5 wt %, preferably 0-0.2 wt %.

In addition to the addition of polyol ester (POE), the refrigeration oil of the present invention may also be incorporated with polyalkylene glycol (PAG) or polyvinyl ether (PVE) to constitute a refrigeration working fluid suitable in use for difluoromethane (R32) refrigerant. PAG may be a polymer prepared from propylene oxide (PO), ethylene oxide (EO) and butylene oxide (BO), etc., alone or in combination. The viscosity of PAG is controlled by controlling the molecular weight thereof via polymerization, and the miscibility of PAG with a refrigerant is controlled by molecular chain capped (single capped or double capped). PVE is a polymer having an ether group in the side chain thereof. The refrigeration oil of the present invention can be combined with PAG or PVE in an appropriate ratio, for example, between 100:0 and 60:40, to expand the performance and the application range thereof.

Analysis and Testing Methods:

Sealed-tube thermal oxidation stability: According to ANSI/ASHRAE Standard 97-2007, into a pressure glass tube, a refrigeration oil and a refrigerant are charged in a weight ratio of 1:1, and then standard metal sheet (copper, aluminum, stainless steel) is charged, before the pressure glass tube is sealed. Then the pressure glass tube is placed in an oven at 175° C. for 14 days. By observing the variations of the metal sheet, the refrigeration oil and the refrigerant before and after heating, the stability of the refrigeration oil under a sealed-tube thermal oxidation is analyzed and compared.

Hydrolysis stability: According to ASTM D-2619, 75 g of a refrigeration lubricant and 25 g of water are charged into a test container in which standard copper sheet to be tested is then charged, and are heated at 93° C. for 48 hours. By observing the variations of the copper sheet and the refrigeration lubricant before and after testing, the hydrolysis stability of the refrigeration lubricant is assessed.

Kinematic viscosity and viscosity index: According to ASTM-D445, the kinematic viscosity is measured at 40° C. and 100° C., based on which two values the viscosity index is calculated.

Density: According to ASTM-D7042, the density of a refrigeration oil is measured at 15° C. 40° C. and 100° C.

Flash point: According to ASTM-D92, the open flash point of a refrigeration oil is measured.

Pour point: According to ASTM-D97, the pour point of a refrigeration oil is measured at low temperature.

Solubility of a refrigerant in a refrigeration oil and kinematic viscosity of the mixture obtained: A refrigeration oil and a refrigerant in a predetermined amount is charged into a pressure vessel designed and set up by our company at low temperature and high vacuum, wherein the temperature, pressure and kinematic viscosity can be measured during the testing. The mixture is first heated to 100° C., and then gradually cooled to 0° C. Throughout the cooling, the temperature, pressure and kinematic viscosity of the mixture are monitored, and the mixture is sampled to analyze the actual components of the refrigerant and the refrigeration lubricant included therein.

The establishment of pressure-viscosity-temperature curve (PVT Curve) of a refrigeration lubricant composition: The solubility curve of a mixture and the kinematic viscosity curve of a mixture are plotted via the calculation of the aforesaid monitored data. The actual kinematic viscosity of the mixture and the solubility of a refrigerant in a refrigeration oil are calculated on a specific operating conditions of a compressor by using the solubility curve and the kinematic viscosity curve.

Two-phase separation temperature: According to ANSI/ASHRAE Standard 86-1994, a refrigeration oil and a refrigerant are charged into a pressure glass tube in a specific amount and then sealed. The glass tube is placed in an oven at a low temperature, and then gradually cooled down to observe the mixing situation of the refrigerant and the refrigeration oil. When the white mist appears until two phases are finally separated at a temperature which is two-phase separation temperature.

Dielectric strength: According to ASTM D-877, any insoluble decomposition products in a refrigeration oil are determined, and the dielectric strength is measured within the time interval between the required repeated breakdown tests.

Moisture measurement: According to ASTM E-1064, Karl Fischer Coulomb-type moisture meter is used.

Acid value: According to ASTM D-974, the titration is carried out with 0.05N KOH standard test solution.

Lubricity test (ASTM D3233 method B Load at Failure Test): The object of Pin-on-Vee test is aimed at measuring the load carrying property of an machine oil at an extreme pressure based on which the lubricating effect of an refrigeration oil is assessed. The contact of four lines is achieved by the rotation of a steel journal fixed in situ through copper safety pin with respect to two fixed V-pulleys. The test piece with the support clamp is immersed an oil sample cup for an oil lubricant. The journal is driven at 250 rpm, and the load is applied to the V-pulley. The load test is started, and a slide is continued during load test by means of a ratchet (Ratchet Wheel). The load is gradually increased until a brass safety pin is broken or a test pin is broken through the slide of the load ratchet. The results of measurements are of torque, related data are obtained from computer automatically records connected with Falex lubrication tester, which are presented by pounds.

EXAMPLE

Example 1: Tri-PE+(NeoC5, nC5, nC7): Viscosity 220 mm²/s, referred to as synthetic ester 1.

Raw materials: tripentaerythritol (TriPE) and Neo-C5 (neopentanoic acid)/nC5 (n-pentanoic acid)/nC7 (n-heptanoic acid) (wt % of the acids=22%:70%:8%), the equivalent ratio of alcohol to acid was 1:1.1.

Synthesis: The foregoing raw materials were charged into a four-hole reactor in a correct proportion. After no leakage of the reactor was confirmed, a little amount of nitrogen was introduced and the temperature was elevated. 700 ppm of catalyst (such as conventional catalyst: methanesulfonic acid, stannous oxide, tetrabutyl titanate, tetrapropyl titanate, stannous oxalate ester or the like) was added when the reaction temperature was elevated to 110° C., and then the temperature is continuously elevated to 200-250° C. which is maintained for 8 hours. The reaction was observed in track to confirm that the OH value of the reactant was less than 3, before the reaction was stopped. After the reaction was stopped, the reaction product was cooled. Excessive fatty acids were removed by a vacuum distillation and alkali washing mode. Finally, the impurities were removed by active carbons, clay and adsorbents to obtain synthetic ester 1 having viscosity of 220 mm$^2$/s.

Additives: 1% of tricresyl phosphate, 200 ppm of 2,6-di-tert-butyl-4-methylphenol, 200 ppm of methyl benzotriazole derivatives, 3000 ppm of acid scavenger.

The additives added in the following Examples 2~16 are not limited to those used in Example 1, and are not necessary to fully be added.

Example 2: TriPE+(NeoC5, nC5, nC7): viscosity 276 mm$^2$/s, referred to as synthetic ester 2.

raw materials: tripentaerythritol (TriPE) and Neo-C5 (neopentanoic acid)/nC5 (n-pentanoic acid)/nC7 (n-heptanoic acid), (wt % of the acids=36.7:47.9:15.4), the equivalent ratio of alcohol to acid was 1:1.

the following Examples 3~16 were identical to Example 1 in the syntheses, purification procedures and the equivalent ratio of alcohol to acid.

Example 3: TriPE+(NeoC5, nC5): viscosity 274 mm$^2$/s, referred to as synthetic ester 3.

raw materials: tripentaerythritol (TriPE) and Neo-C5 (neopentanoic acid)/nC5 (n-pentanoic acid), (wt % of the acids=37.5:62.5).

Example 4: DiPE/TriPE+(NeoC5, nC5, nC7): viscosity 124 mm$^2$/s, referred to as synthetic ester 4.

raw materials: dipentaerythritol/tripentaerythritol (wt % of the polyols=44:56) and NeoC5 (neopentanoic acid)/nC5 (n-pentanoic acid)/nC7 (n-heptanoic acid), (wt % of the acids=16%:67.5%:16.5%).

Example 5: DiPE/TriPE+(NeoC5, nC5, nC7): viscosity 93.3 mm$^2$/s, referred to as synthetic ester 5.

raw materials: dipentaerythritol/tripentaerythritol (wt % of the polyols=75:25) and Neo-C5 (neopentanoic acid)/nC5 (n-pentanoic acid)/nC7 (n-heptanoic acid), (wt % of the acids=32%:48%:20%).

Example 6: DiPE+(NeoC5, nC5, nC7): viscosity 68.6 mm$^2$/s, referred to as synthetic ester 6.

raw materials: dipentaerythritol (DiPE) and Neo-C5 (neopentanoic acid)/nC5 (n-pentanoic acid)/nC7 (n-heptanoic acid), (wt % of the acids=15.3:45.8:38.9).

Example 7: DiPE+(NeoC5, nC5, nC7): viscosity 69.8 mm$^2$/s, referred to as synthetic ester 7.

raw materials: dipentaerythritol (TriPE) and Neo-C5 (neopentanoic acid)/nC5 (n-pentanoic acid)/nC7 (n-heptanoic acid), (wt % of the acids=17.8:60.4:21.8).

Example 8: DiPE+(NeoC5, nC5): viscosity 68.2 mm$^2$/s, referred to as synthetic ester 8.

raw materials: dipentaerythritol and Neo-C5 (neopentanoic acid)/nC5 (n-pentanoic acid), (wt % of the acids=18.3%:81.7%).

Example 9: DiPE+(NeoC10, nC5): viscosity 67.7 mm$^2$/s, referred to as synthetic ester 9.

raw materials: dipentaerythritol (DiPE) and Neo-C10 (neodecanoic acid)/nC5 (n-pentanoic acid), (wt % of the acids=24%:76%).

Example 10: DiPE+(NeoC5, nC7): viscosity 68.5 mm$^2$/s, referred to as synthetic ester 10.

raw materials: dipentaerythritol (DiPE) and Neo-C5 (neopentanoic acid)/nC7(n-heptanoic acid), (wt % of the acids=15%:85%)

mixed ester 1: a mixture of synthetic ester 8 and synthetic ester 10 in an weight ratio of 75:25, viscosity 67.8 mm$^2$/s.

Example 11: PE/Di-PE+(NeoC5, nC5, nC7): viscosity 48.2 mm$^2$/s, referred to as synthetic ester 11.

raw materials: pentaerythritol/dipentaerythritol (wt % of the polyols=41:59) and Neo-05 (neopentanoic acid)/nC5 (n-pentanoic acid)/nC7 (n-heptanoic acid), (wt % of the acids=49.8%:33.4%:16.8%).

Example 12: DiPE+(NeoC5, nC5): viscosity 49.8 mm$^2$/s, referred to as synthetic ester 12.

raw materials: dipentaerythritol and Neo-C5 (neopentanoic acid)/nC5 (n-patenanoic acid), (wt % of the acids=1%:99%).

Example 13: PE/DiPE+(NeoC5, nC5): viscosity 31.3 mm$^2$/s, referred to as synthetic ester 13.

raw materials: dipentaerythritol/pentaerythritol (wt % of the polyols=55:45) and Neo-C5 (neopentanoic acid)/nC5 (n-patenanoic acid), (wt % of the acids=18%:82%).

Example 14: mixed ester 2: a mixture of synthetic ester 8 and Ze-Gles RB68EP (refrigeration oil suitable for commercially available conventional HFC refrigerants) of Comparative Example 8 in a weight ratio of 1:1, viscosity 67.4 mm$^2$/s.

Example 15: PE+(NeO-5, nC5, nC7): viscosity 22.8 mm$^2$/s, referred to as synthetic ester 14.

raw materials: pentaerythritol and Neo-C5 (neopentanoic acid)/nC5 (n-patenanoic acid)/nC7 (n-hepatanoic acid), (wt % of the acids=26%:28%:46%).

Example 16: TPE+(NeoC5, nC5, nC7): viscosity 315 mm$^2$/s, referred to as synthetic ester 15.

raw materials: tripentaerythritol and Neo-C5 (neopentanoic acid)/nC5 (n-patenanoic acid)/nC7(n-hepatanoic acid), (wt % of the acids=34.7%:58.7%:6.6%).

TABLE 1

Viscosity characteristic of synthetic ester of each of Examples:

| No. | synthetic ester No. | Kinematic viscosity | |
|---|---|---|---|
| | | cSt, 40° C. | cSt, 100° C. |
| Example 1 | synthetic ester 1 | 220 | 20.5 |
| Example 2 | synthetic ester 2 | 276 | 22.7 |
| Example 3 | synthetic ester 3 | 274 | 22.5 |
| Example 4 | synthetic ester 4 | 124 | 14 |
| Example 5 | synthetic ester 5 | 93.3 | 11.6 |
| Example 6 | synthetic ester 6 | 68.6 | 9.7 |
| Example 7 | synthetic ester 7 | 69.8 | 9.7 |
| Example 8 | synthetic ester 8 | 68.2 | 9.5 |
| Example 9 | synthetic ester 9 | 67.7 | 9.8 |
| Example 10 | mixed ester 1 | 67.8 | 9.6 |
| Example 11 | synthetic ester 11 | 48.2 | 7.6 |
| Example 12 | synthetic ester 12 | 49.8 | 8.3 |
| Example 13 | synthetic ester 13 | 31.3 | 5.6 |
| Example 14 | mixed ester 2 | 67.4 | 8.8 |
| Example 15 | synthetic ester 14 | 22.8 | 4.5 |
| Example 16 | synthetic ester 15 | 315 | 24.1 |

Comparative Example

Comparative Example 1: Lubrizol (CPI): Solest 220
Comparative Example 2: Lubrizol (CPI): Solest 320
Comparative Example 3: CPI Emkarate RL-100H Comparative Example 4: synthetic oil 5A of Patent Reference 1

Comparative Example 5: synthetic oil 3A of Patent Reference 1

Comparative Example 6: DiPE+(C5,3,5,5-trimethylhexanoic acid): viscosity 122 mm$^2$/s, referred to as synthetic ester 16.

raw materials: dipentaerythritol and C5 (n-patenanoic acid)/trimethylhexanoic acid, (wt % of the acids=76.3%: 23.7%).

Comparative Example 7: CPI EMKARATE RL-68H
Comparative Example 8: JX Nippon Oil: Ze-Gles RB68EP
Comparative Example 9: Emkarate RL-46H
Comparative Example 10: Emkarate RL-32H

TABLE 2

Basic property of synthetic ester of each of Comparative Examples

| No. | synthetic ester No. | Kinematic viscosity cSt, 40° C. | Kinematic viscosity cSt, 100° C. | viscosity Index | pour point |
|---|---|---|---|---|---|
| Comparative Example 1 | CPI Solest 220 | 220 | 18.1 | 90 | −27 |
| Comparative Example 2 | CPI Solest 320 | 319 | 22.8 | 88 | −20 |
| Comparative Example 3 | Emkarate RL-100H | 96.5 | 11.3 | 103 | −28 |
| Comparative Example 4 | synthetic oil 5A of Patent Reference 1 | 97.0 | 10.7 | 92 | −36 |
| Comparative Example 5 | synthetic oil 3A of Patent Reference 1 | 68.1 | 8.5 | 94 | −40 |
| Comparative Example 6 | synthetic ester 16 | 68 | 9.9 | 129 | −48 |
| Comparative Example 7 | Emkarate RL-68H | 66 | 9.4 | 120 | −39 |
| Comparative Example 8 | Ze-Gles RB68EP | 68 | 8.3 | 89 | −40 |
| Comparative Example 9 | Emkarate RL-46H | 45.3 | 7.1 | 116 | −46 |
| Comparative Example 10 | Emkarate RL-32H | 32.2 | 5.8 | 120 | −45 |

For a class of POE lubricants, the presence of high moisture easily lead to the occurrence of the reverse reaction of the esterification in a refrigeration system, whereby esters are cleaved to acids and the stability of a refrigeration lubricant is reduced. Further, when operating at low temperatures, excessive moisture easily freeze, easily damage system and reduce heat transfer area. Examples of the present invention all ensure that water is less than 50 ppm and meets the standards for general POE refrigeration lubricant.

The main impact of the acid value on a refrigeration system has two main aspects: a high acid value readily accelerates a cleavage reaction and causes corrosion of metal materials of the inside of the system. Example 1~14 of the present invention all have been purified to ensure that the acid value meets the standards for conventional POE refrigeration lubricant, and is typically 0.02 mgKOH/g.

A refrigeration oil in a refrigeration system is easily in contact with electrical materials. A dielectric strength is an important parameter in evaluating the insulating properties of a refrigeration lubricant. Too low dielectric strength easily leads to the occurrence of a short circuit during running thereby resulting in motor burnout. The main factors affecting the dielectric strength comprises, in addition to the structural characteristic of a refrigeration oil itself, the removal of impurities and water after reaction (containing residual unreacted raw materials, catalysts, etc.) which is particularly important. The synthetic esters and the mixed esters of the present invention all have been subjected to the removal of water and purification treatment to ensure that the dielectric strength meets the standards for general POE refrigeration lubricant.

TABLE 3

Basic properties of synthetic ester of each of Examples of the present invention

| | Ex 1 | Ex 2 | Ex 3 | Ex 4 | Ex 5 | Ex 6 | Ex 7 | Ex 8 | Ex 9 | Ex 10 | Ex 11 | Ex 12 | Ex 13 | Ex 14 | Ex 15 | Ex 16 |
|---|---|---|---|---|---|---|---|---|---|---|---|---|---|---|---|---|
| Ester No. | S 1 | S 2 | S 3 | S 4 | S 5 | S 6 | S 7 | S 8 | S 9 | M 1 | S 11 | S 12 | S 13 | M 2 | S 14 | S 15 |
| viscosity cSt 40° C. | 220 | 276 | 274 | 124 | 93.3 | 68.6 | 69.8 | 68.2 | 67.7 | 67.8 | 48.2 | 49.8 | 31.3 | 67.4 | 22.8 | 315 |
| viscosity index | 109 | 101 | 100 | 114 | 113 | 123 | 119 | 118 | 128 | 121 | 123 | 140 | 122 | 105 | 112 | 97.1 |
| water ppm | <50 | <50 | <50 | <50 | <50 | <50 | <50 | <50 | <50 | <50 | <50 | <50 | <50 | <50 | <50 | <50 |
| acid value mgKOH/g | <0.02 | <0.02 | <0.02 | <0.02 | <0.02 | <0.02 | <0.02 | <0.02 | <0.02 | <0.02 | <0.02 | <0.02 | <0.02 | <0.02 | <0.02 | <0.02 |
| dielectric strength KV | >30 | >30 | >30 | >30 | >30 | >30 | >30 | >30 | >30 | >30 | >30 | >30 | >30 | >30 | >30 | >30 |

Note:
Ex: Example;
S: synthetic ester;
M: mixed ester

TABLE 4

The comparison of miscibilities of the products of Example 1~5 and 16 and Comparative Example 1~4 with R32 refrigerant (40° C., Kinematic viscosity ≥90 cSt)

|  | Ex 1 | Ex 2 | Ex 3 | Ex 4 | Ex 5 | Ex 16 | CE 1 | CE 2 | CE 3 | CE 4 |
|---|---|---|---|---|---|---|---|---|---|---|
| Type of refrigeration oil | S 1 | S 2 | S 3 | S 4 | S 5 | S 15 | S220 | S320 | R100 | Ref. A |
| Kinematic viscosity cSt, 40° C. | 220 | 276 | 274 | 124 | 93.3 | 315 | 220 | 319 | 96.5 | 97.0 |
| viscosity index | 109 | 101 | 100 | 114 | 113 | 97.1 | 90 | 88 | 103 | 92 |
| Two-phase separation temperature at 20% refrigeration oil, ° C. | −11 | −12 | −27 | −15 | −19 | −8 | Rt. | Rt. | Rt. | 4 |

Note:
Ex: Example;
CE: Comparative Example
S: synthetic ester;
Ref. A: synthetic oil 5A of Patent Reference 1
S220: Solest 220;
S320: Solest 320
R100: Emkarate RL-100H;
Rt.: room temperature In general, the higher the viscosity of the refrigeration oil is, the worse the miscibility of the refrigeration oil with a refrigerant is. However, it can be found from above Table that in the present invention, the kinematic viscosities of POEs of Examples 1~4 are in a range of 122~276 cSt which is higher than the kinematic viscosities of 120~220 cSt of POEs of Comparative Examples 1~2. Further, the two-phase separation temperature of POEs of Examples 1~4 can be adjusted according to the components thereof and the viscosity indexes thereof are maintained to be equal to or more than 100, however refrigeration oils suitable for commercially available conventional HFC refrigerants are not miscible with difluoromethane (R32) refrigerant within the viscosity range, regardless of high or low viscosity index.

Recently, patent (Patent reference 1) related to R32 refrigerant recites that the POE obtained from 2-methyl butyrate, 3,5,5-trimethylhexanoic acid and dipentaerythritol has a viscosity of up to 220~276 cSt and is miscible with R32 refrigerant, but the viscosity index thereof is less than 90 via calculation, and the lubricity thereof will be less than those of the synthetic esters of Examples 1~3 of the present invention.

Further, TW 201435080 A1 (Patent reference 2) recites that the POE obtained from 2-methylpropanoic acid or 2-methylpentanoic acid, 3,5,5-trimethylhexanoic acid and dipentaerythritol has a viscosity of up to 220 cSt, but the viscosity index thereof is also less than 90 via calculation due to the presence of branched structure thereof, and the lubricity thereof will be also less than those of the synthetic esters of Examples 1~3 of the present invention.

The following Lubrizol (CPI) of Comparative Example 1 and 2: Solest 220 and Solest 320 are representative of commercially available POE refrigeration oil having a high viscosity suitable for use with HFC refrigerant, but are not miscible with R32 refrigerant.

TABLE 5

The comparison of miscibilities of the products of Examples 6~10 and 14 and Comparative Examples 5~8 and 11 in a grade of ISO VG 68 with R32 refrigerant (40° C., Kinematic viscosity 68 cst)

|  | Ex 6 | Ex 7 | Ex 8 | Ex 9 | Ex 10 | Ex 14 | CE 5 | CE 6 | CE 7 | CE 8 | CE 11 |
|---|---|---|---|---|---|---|---|---|---|---|---|
| Refrigeration oil | S 6 | S 7 | S 8 | S 9 | M 1 | M 2 | Ref. B | S 16 | E68H | RB68 | S 10 |
| Kinematic viscosity cSt, 40° C. | 68.6 | 69.8 | 68.2 | 67.7 | 67.0 | 67.4 | 68.1 | 68 | 66 | 68 | 68.5 |
| viscosity index | 123 | 119 | 118 | 128 | 121 | 103 | 94 | 129 | 120 | 89 | 128 |
| Two-phase separation temperature at 20% refrigeration oil, ° C. | −2 | −20 | −40 | −14 | −7 | 1 | −30 | −8 | Rt. | Rt. | Rt. |

Note:
Ex: Example
CE: Comparative Example
S: synthetic ester
Ref. B: synthetic oil 3A of Patent Reference 1
E68H: Emkarate RL-68H
RB68: Ze-Gles RB68EP
Rt.: room temperature In comparison with the refrigeration oil of Comparative Example 5, the refrigeration oils of Example 6~10 and Example 14 of the present invention have higher viscosity indexes and obviously more choice on the miscibility with R32 refrigerant, and offer more sealing and lubrication protection of a compressor, prevent refrigerant from leakage and improve operating efficiency, in addition to ensuring the returning of the refrigeration oil from an evaporator. POE refrigeration oils of Comparative Example 7 and Comparative Example 8 suitable for traditional HFC refrigerants are not miscible with R32 refrigerant, that is to say, phase separation occurs at room temperature.

Example 6~10 and 14 of the present invention show that under approximate viscosities and viscosity indexes, the compositional ratio of the refrigeration oil of the present invention can be adjusted as needed thereby changing miscibility with difluoromethane (R32) or the mixed refrigerant containing R32 refrigerant. Further, in response to the needs by the running compressor of the miscibility and two-phase separation temperature to be provided, under the premise of ensuring working viscosity such that a high viscosity index is maintained, the need of lubrication protection of compressor is satisfied and an operating effectiveness is enhanced.

Example 10 and 14 of the present invention show that the refrigeration oils of the present invention can be mixed with each other according to needs, or with the refrigeration oil suitable for use with commercially available conventional HFC refrigerants to change the miscibility with difluoromethane (R32) or the mixed refrigerant containing R32 refrigerant, and in response to the needs by the running compressor of the miscibility to be provided, the need of lubrication protection of compressor is satisfied and an operating effectiveness is enhanced. The mixture of the refrigeration oil of Example 14 with the refrigeration oil suitable for use with commercially available conventional HFC refrigerants also broaden the market applications.

Comparative Example 6 is the embodiment obtained by our company implementing the structural optimization of POE refrigeration oil suitable for use with conventional HCF refrigerants based on the miscibility with R32 refrigerant, which is miscible with R32 refrigerant at temperature of ~8° C., however when being miscible with R32 refrigerant the viscosity thereof is limited to 50~80 cSt due to being limited by the structure, and the lubricity thereof is inferior to those of the structures obtained in Examples provided in the present invention after test.

TABLE 6

The comparison of the miscibilities with R32 refrigerant of Examples with Comparative Examples in grades of ISO VG 22~46

| | Ex 11 | Ex 12 | Ex 13 | Ex 15 | CE 9 | CE 10 |
|---|---|---|---|---|---|---|
| Type of refrigeration oil | S 11 | S 12 | S 13 | S 14 | E46H | E32H |
| Kinematic viscosity cSt, 40° C. | 48.2 | 49.8 | 31.3 | 22.8 | 45.3 | 32.2 |
| viscosity index | 123 | 140 | 122 | 112 | 116 | 120 |
| Two-phase separation temperature at 20% refrigeration oil, ° C. | −8 | −33 | −17 | −9 | Rt. | 17 |

TABLE 6-continued

The comparison of the miscibilities with R32 refrigerant of Examples with Comparative Examples in grades of ISO VG 22~46

| | Ex 11 | Ex 12 | Ex 13 | Ex 15 | CE 9 | CE 10 |
|---|---|---|---|---|---|---|

Note:
Ex: Example
CE: Comparative Example
S: synthetic ester
E46H: Emkarate RL-46H
E32H: Emkarate RL-32H
Rt.: room temperature Higher viscosity indexes are still maintained in Example 11~13 of the present invention when being in a lower viscosity range. Further, an suitable miscibility temperature is provided, depending on the needs by the running compressor. Though POE refrigeration oils with this viscosity range suitable for use with conventional HFC refrigerants have approximate viscosity indexes, however the miscibilities therewith R32 refrigerant are still not so good, that is to say, the separation of two phases occurs at room temperature or around room temperature.

The comparison of working viscosity: The running conditions of refrigeration oil compositions are actually tested and simulated by PVT device provided by our company.

TABLE 7

The data actually measured with PVT device: 24% of R32 refrigerant in a working fluid, the temperature of oil tank at 40° C.

| Samples | Grade of viscosity | Phase separation temperature | Amount of R32 | Temperature | Pressure | Working viscosity |
|---|---|---|---|---|---|---|
| S 5 of Ex5 | 100 | −19° C. | 23% | 40.5 | 1622 | 6.503 |
| S 6 of Ex6 | 68 | 2° C. | 23% | 41.3 | 1811 | 4.782 |
| S 7 of Ex7 | 68 | −19° C. | 24% | 42.2 | 1826 | 4.382 |
| S 8 of Ex8 | 68 | −40° C. | 23% | 43.8 | 1720 | 4.758 |
| SO 3A of Ref. 1 used in CE5 | 68 | −30° C. | 23% | 41.9 | 1872 | 3.644 |
| S 13 of Ex 13 | 32 | −17° C. | 23% | 41.3 | 1856 | 2.804 |

Note:
Ex: Example
CE: Comparative Example
S: synthetic ester
SO: synthetic oil

Taking viscosity ISO VG 68 as examples, the working viscosities of the synthetic esters of Examples 6, 7 and 8 all are higher than that of the synthetic oil 3A of Patent Reference 1 used in Comparative Example 5 after actually being measured under the premise that the amount of the refrigerant and the temperature of oil tank are controlled to be identical. The pressure of the synthetic ester of each of the Examples is less than that of the Comparative Example under the same measurement conditions, which shows that the lubricating and protection effects of the synthetic esters of Examples are significantly better than that of the Comparative Example under the running conditions.

Under the premise of excluding security concerns and conforming with regulatory requirements, R32 refrigerant is expected to develop towards the applications of large refrigeration equipments in the future. The application of the combination of refrigeration oils having viscosity ISO VG 100 or more with R32 refrigerant is the direction of development in the future. In the low viscosity application, after overcoming the difficulties in designing and manufacturing small equipments, the combination of R32 refrigerant with the refrigeration oil favors the application of small equipments such as refrigerators and dehumidifiers due to the advantages of cost and performance. Therefore, the synthetic ester 5 having viscosity ISO VG 100 of Example 5 and the synthetic ester 13 having viscosity ISO VG 32 of Example 13 in above Table are also actually measured to obtain relevant working data.

stability of a refrigeration oil consists in that: the test is carried out in a condition that a refrigerant is miscible with a refrigeration oil in a high temperature and high pressure, which can accelerate to identify the difference in the stability

TABLE 8

The comparison of working viscosities of the mixtures of the refrigeration oils of Examples and R32 refrigerant: the test values obtained from PVT substituting theoretical simulation

| Description of refrigeration oils | | | Phase separation temperature for R32 20% of refrigeration oil (Miscibility) | PVT test: ANSI/AHRI standard 540 Calculation condition: oil temperature of 85° C., Condenser temperature of 54.4° C. | | | |
|---|---|---|---|---|---|---|---|
| | | | | R32/3473Kpa | | R410A/3393Kpa | |
| | viscosity ISO VG | viscosity index VI | | Ratio of refrigerant % | Working viscosity cSt | Ratio of refrigerant % | Working viscosity cSt |
| S 6 of Ex 6 | 68 | 123 | −2° C. | 17.17% | 2.8 | | |
| S 7 of Ex 7 | 68 | 119 | −20° C. | 15.76% | 3.01 | | |
| S 8 of Ex 8 | 68 | 118 | −40° C. | 18.11% | 2.61 | | |
| Ref. B of CE 5 | 68 | 94 | −30° C. | 15.74% | 2.4 | | |
| RB68 of CE 8 | 68 | 90 | room temperature | | | 20.76% | 2.72 |

Note:
Ex: Example;
CE: Comparative Example
S: synthetic ester;
SO: synthetic oil
Ref. B: synthetic oil 3A of Patent Reference 1;
RB68: Ze-Gles RB68EP ANSI/AHRI Standard 540 specifies normal simulation method for evaluating the performance of a compressor. According to the conditions specified therein, the working fluids formed by the synthetic esters of Example 6, 7 and 8 of the present invention and R32 refrigerant are evaluated based on which it is shown that the working fluids formed by the synthetic esters of Example 6, 7 and 8 of the present invention and R32 refrigerant, in addition to meeting the requirement for a specific two-phase separation temperature, are significantly superior to the working fluid formed by the synthetic oil 3A of Patent Reference 1 of Comparative Example 5 and R32 refrigerant in the working viscosities, the difference in viscosity therebetween ranging from 8.8% to 25%. The higher working viscosity of a working fluid ensures that the lubricant film formed is thicker, has a better lubricity and a good sealability.

Refrigeration oil having viscosity ISO VG 68 is currently used in a household air-conditioning rotary compressor commonly utilizing R410A refrigerant. The working fluid of such system is formed of RB68 of Comparative Example 8 and R410A refrigerant. The working viscosities of the working fluids formed of the synthetic esters of Example 6~8 of the present invention and R32 refrigerant are comparable to or higher than that of the working fluid formed of RB68 of Comparative Example 8 and R410A refrigerant, whereby ensuring that the lubricant film is thicker, has a better lubricity and a good sealability during the running of the compressor.

Sealed-tube thermal oxidation stability test, testing method: ANSI/ASHRAE Standard 97-2007

In the refrigeration system, when evaluating the stability of a refrigeration oil, Sealed-tube thermal oxidation stability test is most commonly used. The biggest difference between this method and the general method for evaluating the of the refrigerant oil. The fact that thermal oxidation stability get worsened, leads to the decomposition of a refrigerant and a refrigeration oil, in turn easily causes blockage and corrosion of system, and increases wear.

TABLE 9

The comparison of sealed-tube thermal oxidation stability: R32 refrigerant

| ANSI/ASHRAE Standard 97-2007 | | Synthetic ester 7 of Example 7 | Synthetic oil 3A of Patent Reference 1 of Comparative Example 5 | Synthetic ester 16 of Comparative Example 6 |
|---|---|---|---|---|
| Refrigerant | | R32 | R32 | R32 |
| Moisture in a refrigeration lubricant before testing (ppm) | | <50 | <50 | <50 |
| Appearance of a refrigeration lubricant after testing | | clear | clear | clear |
| Sludge formation | | none | none | none |
| Acid value (mgKOH/g) | Before testing | 0.01 | 0.01 | 0.01 |
| | After testing | <0.1 | <0.1 | <0.1 |
| The state of metal* | Copper | ◎ | ◎ | ◎ |
| | Stainless steel | ◎ | ◎ | ◎ |
| | Aluminum | ◎ | ◎ | ◎ |

*Evaluation Criteria: ◎: No change; Δ: Slight Color Change; X: Sharp color change The refrigeration oil of the present invention maintains an excellent thermal oxidation stability under a R32 refrigerant environment, and after sealed-tube thermal oxidation stability, the quality of the refrigeration oil does not significantly deteriorate and the appearance of metal sheet does not corrode, either.

The comparison of hydrolysis stability (ASTM D-2619)

TABLE 10

The comparison of hydrolysis stability in sealed tube: R32 refrigerant, the addition of the additives used in Example 1

|  |  | Synthetic ester 7 of Example 7 | Synthetic ester 8 of Example 8 | Synthetic ester 9 of Example 8 | Synthetic oil 3A of Patent Reference 1 of Comparative Example 5 | Synthetic ester 16 of Comparative Example 6 |
|---|---|---|---|---|---|---|
| Refrigerant |  | R32 | R32 | R32 | R32 | R32 |
| Moisture in a refrigeration lubricant before testing (ppm) |  | 500 | 500 | 500 | 500 | 500 |
| Appearance of a refrigeration lubricant after testing |  | clear | clear | clear | clear | clear |
| Sludge formation |  | none | none | none | none | none |
| Acid value (mgKOH/g) | Before testing | 0.01 | 0.01 | 0.01 | 0.01 | 0.01 |
|  | After testing | <0.1 | <0.1 | <0.1 | <0.1 | <0.1 |
| The state of metal* | Copper | ◎ | ◎ | ◎ | ◎ | ◎ |
|  | Stainless steel | ◎ | ◎ | ◎ | ◎ | ◎ |
|  | Aluminum | ◎ | ◎ | ◎ | ◎ | ◎ |

*Evaluation Criteria: ◎: No change; Δ: Slight Color Change; X: Sharp color change The refrigeration oil of the present invention maintains an excellent hydrolysis stability under a R32 refrigerant environment.

In general, the opportunity of contacting moisture in a sealed refrigeration system is minimal, however for a large refrigeration system it is still possible for the moisture to enter the refrigeration system due to the negligence of operation, and for a small refrigeration system it is also possible for the moisture to enter the refrigeration system due to the needs of maintenance and repair or charging refrigerant, hence the use of a refrigeration oil having hydrolysis resistance can avoid the hydrolysis of a refrigeration oil caused by entrance of a small amount of moisture into the system, and in turn resulting in the abrasion or wear of the system or blocking the system by the formation of sludge.

According to the results of hydrolysis test shown in Table 10, the structure of the refrigeration oil of the present invention has a good hydrolysis stability, hence in an abnormal conditions of 500 PPM water, only the additions of the additives widely used for HFC refrigerants can maintain a refrigeration fluid stable and prevented from decomposition, and prevent the appearance of a metal specimen from corroding.

The comparison of lubricity test (ASTM D 3233 Test Methods for Measurement of Extreme Pressure Properties of Fluid Lubricant)

TABLE 11

The results of lubricity measured with Falex test machine

| refrigeration oil | Samples | Viscosity (ISO VG) | ASTM D 3233 Test Methods for Measurement of Extreme Pressure Properties of Fluid Lubricant (lbs. force at failure), 80° C. |
|---|---|---|---|
| refrigeration lubricant suitable for commercially available HFC refrigerant (R410A) | | | |
| Comparative Example 1 | Solest 220 | 220 | 801 |
| Comparative Example 2 | Solest 320 | 320 | 768 |

TABLE 11-continued

The results of lubricity measured with Falex test machine

| refrigeration oil | Samples | Viscosity (ISO VG) | ASTM D 3233 Test Methods for Measurement of Extreme Pressure Properties of Fluid Lubricant (lbs. force at failure), 80° C. |
|---|---|---|---|
| Comparative Example 7 | Emkarate RL-68H | 68 | 973 |
| Comparative Example 8 | Ze-Gles RB68EP | 68 | 748 |
| Comparative Example 6 | synthetic ester 16 | 68 | 1105 |
| Comparative Example 10 | EMKARATE RL-32H | 32 | 1002 |
| refrigeration oil suitable for use with R32 refrigerant | | | |
| Comparative Example 4 | synthetic oil 5A of Patent Reference 1 | 100 | 902 |
| Comparative Example 5 | synthetic oil 3A of Patent Reference 1 | 68 | 947 |
| Example 1 | synthetic ester 1 | 220 | 1130 |
| Example 5 | synthetic ester 5 | 100 | 1149 |
| Example 6 | synthetic ester 6 | 68 | 1326 |
| Example 8 | synthetic ester 8 | 68 | 1217 |
| Example 12 | synthetic ester 12 | 46 | 1252 |
| Example 13 | synthetic ester 13 | 32 | 1158 |
| Example 15 | synthetic ester 14 | 22 | 1090 |
| Example 16 | synthetic ester 15 | 320 | 995 |

In accordance with the results of Falex lubricity test shown in the above, the lubricating effects of the refrigeration oil having viscosity ISO VG 68 of Examples 6 and 8 of the present invention are obviously superior to those of the refrigeration oil having the same viscosity suitable for use with commercially available HFC refrigerants of Comparative Examples 7~8 and the synthetic oil 3A having the same viscosity suitable for use with R32 refrigerant of Patent Reference 1 of Comparative Example 5. The lubricating effects of the refrigeration oil having viscosity 93 (ISO VG 100) of Example 5 of the present invention is also obviously superior to that of the synthetic oil 5A having viscosity 97.8 (ISO VG 100) suitable for use with R32 refrigerant of Patent Reference 1 of Comparative Example 4. The lubricating effects of the refrigeration oil having low viscosity ISO VG 46/32/22 of Examples 12, 13 and 14 of the present invention are also superior to that of EMKARATE RL-32H refrigeration oil having viscosity ISO VG 32 widely used for commercially available HFC refrigerant of Comparative Example 10.

Being restricted to the limitation on miscibility and lubricity, a refrigeration oil having viscosity ISO VG above 220 (included) and suitable for use with R32 refrigerant is not currently developed in the industry, the viscosity range of the refrigeration oil of the present invention can be broadened from ISO VG 22 to ISO VG 320 due to the structure factor thereof. The lubricities of the refrigeration oils having high viscosity of Example 1 (ISO VG 220) and Example 15 (ISO VG 320) are obviously superior to those of Solest 220 having viscosity ISO VG 220 and Solest 320 having viscosity ISO VG 320 widely used for HFC refrigerant of Comparative Example 1 and Comparative Example 2 shown in Table 11.

To sum up the aforesaid interpretation, it is shown from the results of Falex wear test, the refrigeration oils having various grades of viscosity of Examples of the present invention are superior to Comparative Examples due to the specific structure of the fatty acid involved therein, regardless of the level of viscosity. It is shown that the lubricity of the refrigeration oil of the present invention are obviously superior to those of various refrigeration oils suitable for use with HFC refrigerant, in addition to the refrigeration oil specifically suitable for use with R32 refrigerant.

The invention claimed is:

1. A composition comprising one or more polyol ester(s) (POE) obtained by reacting a polyol, a $C_{4-10}$ straight or branched chain fatty acid and a Neo-$C_{5-10}$ acid as a refrigeration oil for a difluoromethane (R32) refrigerant or a mixed refrigerant containing difluoromethane (R32) refrigerant, wherein the Neo-$C_{5-10}$ acid is in an acid portion in an amount of 1-50 wt %.

2. The composition according to claim 1, wherein the polyol is at least one selected from the group consisting of neopentyl glycol (NPG), 3-hydroxy-2,2-dimethylpropyl 3-hydroxy-2,2-dimethylpropanoate (HPHP), trimethylolpropane (TMP), ditrimethylolpropane (DiTMP), pentaerythritol (PE), dipentaerythritol (DiPE) and tripentaerythritol (Tri-PE).

3. The refrigeration lubricant composition according to claim 1, wherein the Neo-$C_{5-10}$ acid is in the acid portion in an amount of 10-30 wt %.

4. The composition according to claim 1, wherein the fatty acid comprises n-butyric acid, n-pentanoic acid, n-hexanoic acid, n-heptanoic acid, n-octanoic, n-nonanoic acid, n-decanoic acid, 2-methyl-butyric acid, 3-methyl-butyric acid, 2-ethylpentanoic acid, 2-ethylhexanoic acid, or 3,5,5-trimethylhexanoic acid and the like.

5. The composition according to claim 1, wherein the Neo-$C_{5-10}$ acid comprises neopentanoic acid, neohexanoic acid, neoheptanoic acid, neooctanoic, neononanoic acid, or neodecanoic acid, or mixture of each of the aforesaid acid(s).

6. The composition according to claim 1, wherein the polyol ester is miscible with the difluoromethane (R32) refrigerant or the mixed refrigerant containing difluoromethane (R32) refrigerant at a temperature of higher than −50° C. and less than 15° C. (20% of a polyol ester in a refrigerant) according to ANSI/ASHRAE Standard 86-1994, and has a kinematic viscosity between 22 and 320 cSt at 40° C. according to ASTM-D445.

7. A refrigeration lubricant composition comprising the composition according to claim 1, and a difluoromethane (R32) refrigerant or a mixed refrigerant containing difluoromethane (R32) refrigerant.

8. The refrigeration lubricant composition according to claim 7, wherein the refrigeration oil and the refrigerant are used in an amount of 1/99-50/50.

9. The refrigeration lubricant composition according to claim 7, further comprising extreme pressure additives, metal deactivators, acid scavengers, anti-oxidants, or other synthetic refrigeration lubricants.

10. The refrigeration lubricant composition according to claim 9, wherein the other synthetic refrigeration lubricants are polyalkylene glycols (PAG) or polyvinyl ether (PVE), wherein the ratio of the polyol ester included in the refrigeration oil to the PAG or PVE is between 100:0 and 60:40.

11. The refrigeration lubricant composition according to claim 10, wherein the extreme pressure additives are added in an amount of 0-4 wt %, the metal deactivators are added in an amount, of 0-0.5 wt %, the acid scavengers are added in an amount of 0-2 wt %, and the anti-oxidants are added in an amount of 0-1 wt %.

* * * * *